(12) United States Patent
Michener et al.

(10) Patent No.: US 6,323,909 B1
(45) Date of Patent: Nov. 27, 2001

(54) METHOD AND APPARATUS FOR TRANSMITTING HIGH DEFINITION TELEVISION PROGRAMMING USING A DIGITAL SATELLITE SYSTEM TRANSPORT AND MPEG-2 PACKETIZED ELEMENTARY STREAMS (PES)

(75) Inventors: James A. Michener, Grass Valley, CA (US); Robert H. Plummer, Seattle, WA (US); Chao-Kung Yang, Huntington Beach, CA (US)

(73) Assignee: Hughes Electronics Corporation, El Segundo, CA (US)

( * ) Notice: Subject to any disclaimer, the term of this patent is extended or adjusted under 35 U.S.C. 154(b) by 0 days.

(21) Appl. No.: 09/181,412

(22) Filed: Oct. 28, 1998

(51) Int. Cl.[7] .................................................. H04N 9/475
(52) U.S. Cl. .............................................. 348/512; 386/68
(58) Field of Search ..................... 248/423, 424, 248/426, 427, 455, 456, 512, 510, 511; 370/389, 509, 94.1; 386/91, 92, 93, 94, 95, 96, 97, 111, 112, 68; 714/746; H04N 9/475

(56) References Cited

U.S. PATENT DOCUMENTS

| | | | |
|---|---|---|---|
| 5,502,573 | * 3/1996 | Fujinami | 358/339 |
| 5,579,317 | * 11/1996 | Pang et al. | 370/94.1 |
| 5,621,840 | * 4/1997 | Kawarmura et al. | 386/91 |
| 5,650,825 | * 7/1997 | Naimpally | 348/465 |
| 5,726,989 | * 3/1998 | Dokic | 370/509 |
| 5,737,479 | * 4/1998 | Fujinami | 386/95 |
| 5,792,971 | * 11/1998 | Timis et al. | 84/609 |
| 5,808,722 | * 9/1998 | Suzuki | 352/12 |
| 5,818,935 | * 10/1998 | Maa | 380/20 |
| 5,836,678 | * 11/1998 | Davis et al. | 370/389 |
| 5,953,489 | * 9/1999 | Park | 386/109 |
| 6,016,473 | * 1/2000 | Dolby | 704/500 |
| 6,022,223 | * 2/2000 | Taniguchi et al. | 434/307 |
| 6,026,506 | * 11/1998 | Anderson et al. | 714/746 |
| 6,081,299 | * 6/2000 | Kesselring | 348/512 |

OTHER PUBLICATIONS

"Program/Episode/Version Identification ATSC Standard," Doc. A/57, Aug. 30, 1996, *Advanced Television Systems Committee*.

"Harmonization with DVB SI In the Use of the ATSC Digital Television Standard," Doc. A/58, Sep. 14, 1996, *Advanced Television Systems Committee*.

McKinney, et al., "Digital Audio Compression Standard (AC–3)," Doc. A/52, Dec. 20, 1995, *Advanced Television Systems Committee*.

(List continued on next page.)

*Primary Examiner*—Chris Kelley
*Assistant Examiner*—Tung Vo
(74) *Attorney, Agent, or Firm*—John A. Crook; Michael W. Sales

(57) ABSTRACT

A system and method for distributing high definition television (HDTV) and standard definition television (SDTV) signals via satellite is disclosed. At the transmission station an MPEG-2 video encoder compresses a video signal and a digital encoder encodes an audio signal. The compressed video and the encoded audio are coupled to PES packetizers, which generate video and audio packetized elementary data streams having PES headers and PES payloads. Within each PES header is a presentation time stamp (PTS), which is representative of the time at which the payload is to be displayed to the user. The packetized elementary data streams are multiplexed together by a transport multiplexer and repacketizer and broadcast to receiver stations, via satellite. The receiver stations receive the PES information and obtain the PTS. A receiver station multiplies the PTS by 300 and compares its local clock reference to that time. When the local clock reference and the PTS are identical, the PES audio and video information is displayed to the user according to the local clock reference.

20 Claims, 6 Drawing Sheets

OTHER PUBLICATIONS

McKinney, et al., "Guide to the Use of the ATSC Digital Television Standard," Doc. A/54, Oct. 4, 1995, *Advanced Television Systems Committee*.

"Program Guide for Digital Television ATSC Standard," Doc. A/55, Jan. 3, 1996 *Advanced Television Systems Committee*.

"System Information for Digital Television ATSC Standard," Doc. A/56, Jan. 3, 1996 *Advanced Television Systems Committee*.

"Information technology—Generic coding of moving pictures and associated audio information: Systems," ISO/IEC Standard 13818-1, Apr. 15, 1996.

"Information technology—Generic coding of moving pictures and associated audio information: Video," ISO/IEC Standard 13818-2, May 15, 1996.

* cited by examiner

METHOD AND APPARATUS FOR TRANSMITTING HIGH DEFINITION TELEVISION PROGRAMMING USING A DIGITAL SATELLITE SYSTEM TRANSPORT AND MPEG-2 PACKETIZED ELEMENTARY STREAMS (PES)

BACKGROUND OF THE INVENTION

1. (a) Field of the Invention

The present invention relates generally to broadcast television and, more particularly, to a method and apparatus for transmitting high definition television (HDTV) programming using a digital satellite system transport.

2. (b) Description of Related Art

It is well known to transmit analog television signals over terrestrial networks. Such networks typically broadcast signals over a relatively small geographical area using the UHF or VHF frequency bands. Although still widely used, these UHF, VHF broadcast systems have significant shortcomings. For example, in order for consumers to receive a sufficiently strong signal from a terrestrial network, the consumer must typically be located near a major city (e.g., Los Angeles, Chicago or Denver). Additionally, terrestrial networks broadcast a relatively small amount of information for the bandwidth that they occupy. For the broadcast of a given program, analog terrestrial networks devote one frequency entirely to that program. Because there must be separation between transmission frequencies in a traditional broadcast system, there are relatively few programming channels available using analog terrestrial broadcast methods.

Cable television networks transmit programming channels over coaxial cable. While cable technology has greatly increased the number of channels available to a television user, the cost, materials and manpower associated with the installation and maintenance of the cable system infrastructure is quite high. These costs are typically passed on to the cable system's subscribers in their subscription fees. Additionally, cable television is not available in areas of the country where demand is insufficient.

Digital direct-to-home (DTH) satellite systems broadcast hundreds of programming channels to a very wide geographical area (e.g., the continental United States). One example of such a broadcast satellite television system is the DIRECTV® system. Broadcast satellite systems can provide many channels due to their efficient use of bandwidth. MPEG-2 video compression is one particular method of efficient bandwidth usage employed by broadcast satellite systems. The information for broadcast is converted into digital signals that are divided into packets. Each packet is assigned a header that is used to identify the information for a particular television service. The identifying information in the header is referred to as a service channel identification (SCID) or a program identification (PID). After the data have been put into packets, the packets are transmitted to a satellite, which rebroadcasts the packets over the satellite's coverage area. Each subscriber within the coverage area can receive the broadcast programming by tuning their receiver to the proper frequency and obtaining the appropriate packets based on the SCID in the header of each packet. Broadcast satellite systems eliminate the need for the massive infrastructure that cable systems require, thereby making it easy to add subscribers to the system.

The progression from terrestrial television broadcast to cable television, to DTH satellite television has allowed consumers to obtain more and more programming information while limiting the costs that are passed to the consumers. However, all of the DTH programming has been standard definition television (SDTV), which is also called conventional definition television (CDTV).

High definition television (HDTV) has a resolution of approximately twice that of SDTV in both the vertical and the horizontal dimensions. HDTV provides motion picture video resolution and CD-quality sound to a viewer at home. Additionally, the aspect ratio selected for HDTV is 16:9, which is similar to the 1.76:1 ratio used in the motion picture industry. The HDTV standard, as set forth in advanced television standards committee (ATSC) documents A/53 and A/54, specifies the use of MPEG-2 video processing in accordance with ISO/IEC standard 13818, and digital audio processing in accordance with ATSC document A/52. Plans are in place in the United States and many other countries of the world to transition from SDTV to HDTV in the near future. However, there are no known methods that enable DTH satellite systems, or any other systems (e.g., cable systems) using defined data transfer protocols, to broadcast data that is generated in accordance with HDTV standards.

SUMMARY OF THE INVENTION

In one embodiment, the present invention is embodied in a transmission station for transmitting programming in a first format and a second format. The transmission station includes a video encoder for generating digitally encoded video signals in the first format, a packetizer coupled to the video encoder for packetizing the digitally encoded video signals in the first format into a first packet format, and a repacketizer connected to the packetizer for repacketizing the digitally encoded video signals in the first format into a second packet format. The present invention may also include an audio encoder for generating digitally encoded audio signals in the first format, a second packetizer coupled to the audio encoder for packetizing the digitally encoded audio signals in the first format into the first packet format, the second packetizer further coupled to the repacketizer. Wherein, the first format is a high definition television (HDTV) format and the second format is a standard definition television (SDTV) format.

In another embodiment, the present invention may be a receiver station for receiving transmissions in a first format and a second format. The receiver station includes, a transport demultiplexer for demultiplexing a received signal into an audio component and a video component, a video decoder coupled to the transport demultiplexer for decoding the video component, and an audio decoder coupled to the transport demultiplexer for decoding the audio component. Wherein, the first format is a high definition television (HDTV) format and the second format is a standard definition television (SDTV) format.

Alternatively, the present invention may be embodied in a method of transmitting programming in a first format and a second format. The method includes the steps of digitally encoding video signals into the first format, packetizing the digitally encoded video signals in the first format into a first packet format, and repacketizing the packetized digitally encoded video signals in the first format into a second packet format. The method may further include the steps of digitally encoding audio signals into the first format, packetizing the digitally encoded audio signals in the first format into the first packet format; and repacketizing the packetized digitally encoded audio signals in the first format into a second packet format. Wherein, the first format comprises a high definition television (HDTV) format and the second format comprises a standard definition television (SDTV) format.

The invention itself, together with further objects and attendant advantages, will best be understood by reference to the following detailed description, taken in conjunction with the accompanying drawings.

DESCRIPTION OF THE PREFERRED EMBODIMENTS

The present invention is embodied in a method and apparatus for broadcasting high definition television (HDTV) signals and programming. As used herein, the term programming refers to audio, video, data or any other information that may be broadcast. The HDTV signals may be broadcast via a variety of different media (e.g., via satellite in a DTH system). In particular, the present invention allows for the broadcast of HDTV signals and standard definition television (SDTV) signals in the same system without changing existing transport protocols. For example, the present invention uses the current SDTV satellite broadcast systems and protocols, while supporting the broadcast of HDTV signals using standard HDTV equipment and protocols. According to the present invention, a number of audio and/or video signals are packetized, according to standard HDTV protocol into packetized elementary streams (PES) and combined (e.g., using statistical multiplexing) with additional data to form a master data stream. The master data stream (which is characterized primarily by data that is in the HDTV format) is packetized into transmission packets that are compatible with the transmission system (e.g., a DTH system, which is typically characterized primarily by data/signals that are in the SDTV format). The transmission packets are transmitted (e.g., via satellite retransmission) to receiver stations. A method is provided at the receiver stations for resolving the different timing designations and clock speeds that may be needed in order to decode the SDTV and HDTV data/signals Referring now to FIG. 1, a diagram of one preferred embodiment of a satellite broadcast transmission system 40 capable of utilizing the present invention is shown. The system 40 includes a transmission station 50, a satellite 55, and a plurality of receiver stations 60. The transmission station 50 processes SDTV and HDTV signals (in a manner described in more detail later in this disclosure) and transmits/broadcasts them to the satellite 55. The HDTV signals may include video, audio or data. The satellite 55 receives the signals and appropriately processes them for rebroadcast. Processing may include, but is not limited to, frequency conversion and power amplification. The processed signals are then rebroadcast by the satellite 55 to the receiver stations 60, which may be located in geographically remote locations.

Figure 1:
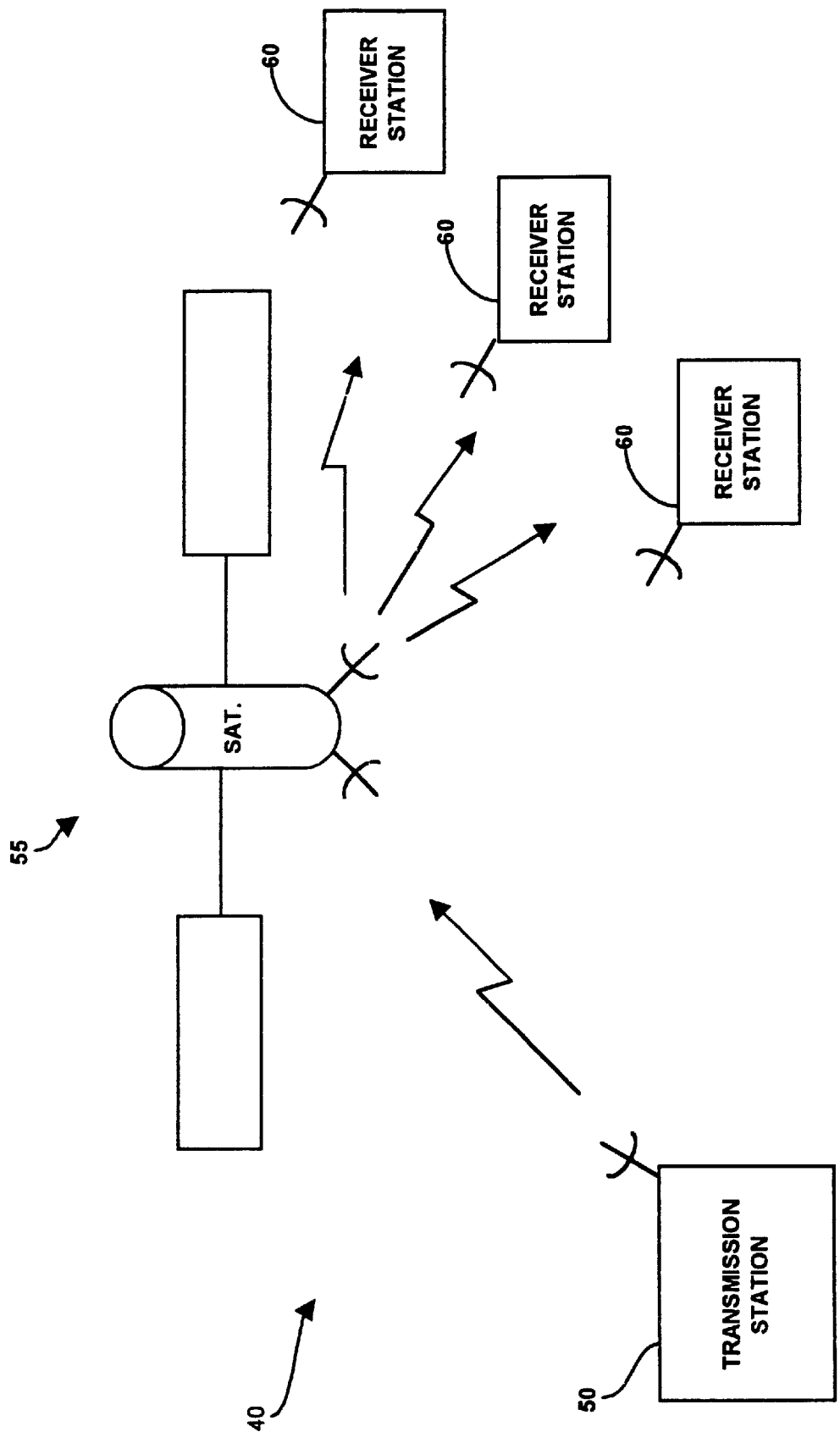
FIG. 1 is a diagram of a satellite broadcast system capable of implementing the present invention.
Figure 2:
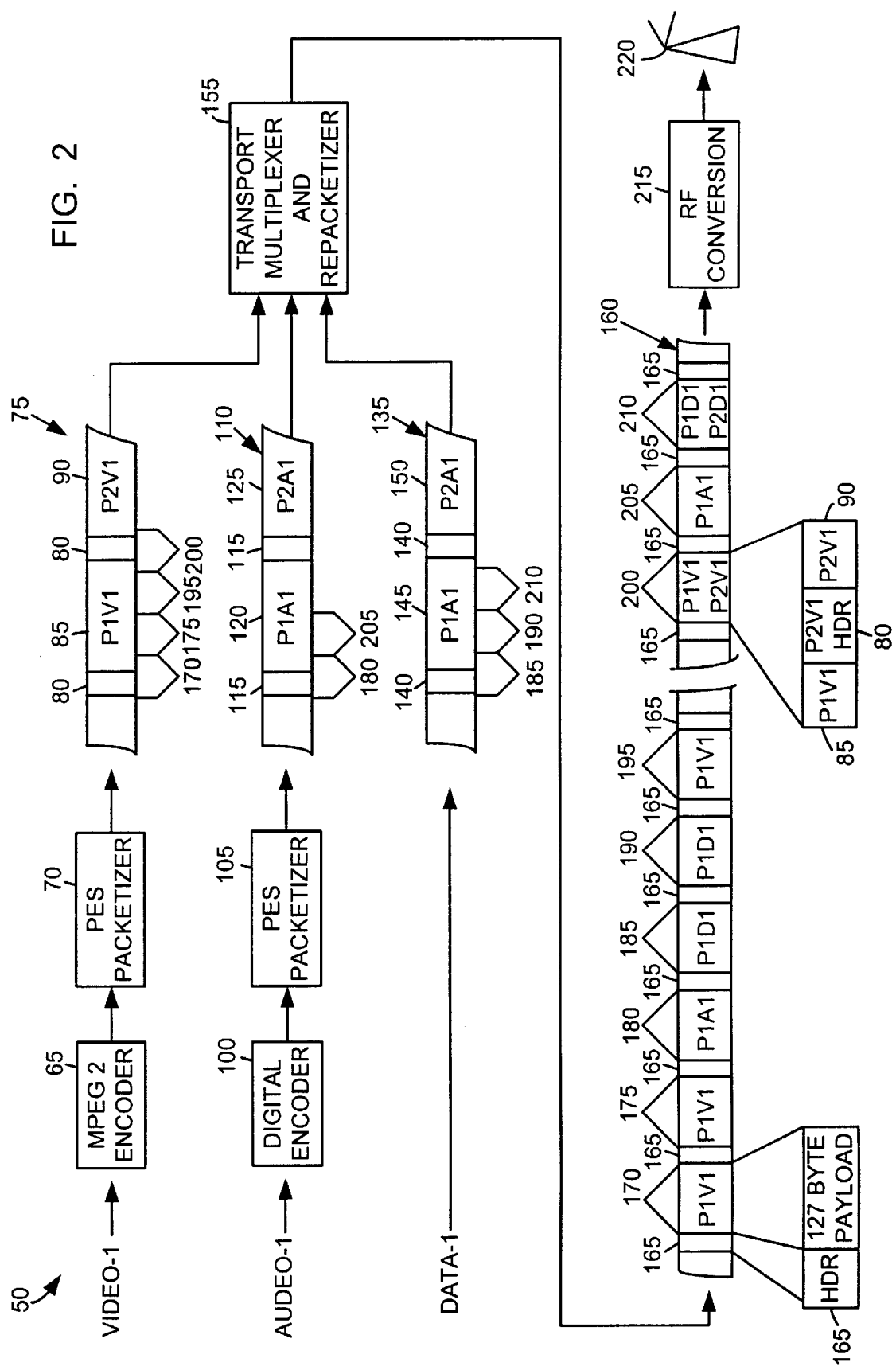
FIG. 2 is a detailed diagram of the transmission station shown in FIG. 1.

FIG. 2 is a diagram illustrating how data flows through the transmission station 50 shown in FIG. 1. In general, the transmission station 50 provides a variety of video, audio, and data processing functions. The video processing function includes an MPEG-2 encoder 65 and a PES packetizer 70 for placing the HDTV signals in an appropriate HDTV format In operation, a video signal for transmission is coupled to the MPEG-2 encoder 65, which processes the video signal. Video is processed on a frame-by-frame basis in accordance with the MPEG-2 standard to create access units for each frame.

As is well known, MPEG-2 encoding is based on the principle that successive frames of a video image are largely redundant. For example, the background of an image may stay constant over numerous video frames. Generally, video compression in the MPEG-2 system is accomplished by predicting motion that occurs from one frame of video to another and transmitting motion vectors with background information, which enables a receiver to create the next video frame from the current video frame. Accordingly, only the motion and background difference between two frames of video need be broadcast. More specifically, an MPEG-2 cycle generates intra-coded pictures (I-frames), predictive coded pictures (P-frames), and bi-directionally predictive coded pictures (B-frames) from a sequence of video frames. I-frames exploit the spatial redundancy within a single picture (frame or field). I-frames do not take advantage of temporal characteristics of the video and do not use any interframe coding. More data is associated with I-frames than with P or B-frames.

P-frames are frames that utilize temporal prediction in the forward direction (i.e., predictions for the P-frame are formed only from pixels in the most recently decoded I-frame or P-frame). P-frames exploit interframe coding techniques to improve compression efficiency and picture quality.

B-frames are frames that include prediction from a future frame as well as from a previous frame. The referenced future or previous frames are either I-frames or P-frames.

Accordingly, the size of an access unit created from a video frame varies based on the video content of the frame and the MPEG-2 cycle. The MPEG-2 cycle may create an I-frame that has a large access unit, or P or B-frames that have relatively small access units.

The access units from the MPEG-2 encoder 65 are passed to the program encapsulated stream (PES) packetizer 70, which creates a video PES stream 75, in a known manner. The video PES stream 75 consists of a number of PES packets, which include PES headers 80 and PES payloads 85, 90. PES packets are variable length packets and may have a maximum size of 64 kilobytes (KB). Alternatively, for certain applications such as video processing, PES packets may be unconstrained in size. The diagram in FIG. 2 shows two video PES packets having payloads $P_1V_1$ 85 and $P_2V_1$ 90 representing first and second PES payloads created from the video-1 source.

Audio is processed in a similar manner to video. Specifically, audio for broadcast is coupled to a digital encoder 100 (e.g., an AC-3 Dolby Digital Encoder). The digital encoder 100 creates one data packet for each 32 ms of audio. The encoded audio data packets are passed to a PES packetizer 105, which processes the encoded audio data to create an audio PES stream 110, in a known manner. The audio PES stream 110 consists of a number of PES packets that include PES headers 115 and PES payloads, which may be variably sized. FIG. 2 shows two audio PES packets having payloads $P_1A_1$ 120 and $P_2A_1$ 125 representing first and second PES payloads created from the processing of the source audio-1.

Data for transmission is in the form of a data stream 135. Data for transmission may include, but is not limited to, electronic program guide data or conditional access data. Since the data stream 135 does not contain time-sensitive data, it is not PES packetized but, rather, is provided in pre-packetized form to the transmission station 50. The data stream 135 shown in FIG. 2 includes a number of packets, each having a header 140 and a payload 145, 150. FIG. 2 represents two payloads $P_1D_1$ 145 and $P_2D_1$ 150 representing first and second payloads provided by the data source data-1.

In accordance with the present invention, the video PES stream 75, the audio PES stream 110 and the data stream 135 are coupled to a transport multiplexer and repacketizer 155, which selectively combines the streams 75, 110, 135 into a master stream 160, composed of a number of transport packets. The master stream 160 includes data from the video PES stream 75, the audio PES stream 110, and the data stream 135, as represented by a stream of payloads having reference numerals 170, 175, 180, 185, 190, 195, 200, 205, and 210. In keeping with the present invention, the transport multiplexer and repacketizer 155 adds a transport header 165 to each portion of information pulled from the streams 75, 110, 135. The information pulled from the streams 75, 110, 135 is referred to as transport payload and, in one preferred embodiment of the present invention, is preferably 127 bytes long. Preferably, the transport header 165 is three bytes in length and contains a service channel identification (SCID) that can be used to filter each transport data packet at the receiver stations 60. In the disclosed embodiment, there is no requirement that the PES packets and transport packets be aligned. For example, the beginning of a PES packet need not come at the beginning of a transport packet, nor is it required that the end of a PES packet correspond to the end of a transport packet. This is most clearly seen with reference to payload 200 within the master stream 160. In payload 200, data associated with $P_1V_1$ ends and data associated with $P_2V_1$ begins in the middle of the transport packet payload.

Once assembled, the master stream 160 is passed to an RF conversion function 215, which appropriately modulates the transport packets onto an RF carrier signal. The transport packets include headers 165 and payloads 170, 175, 180, 185, 190, 195, 200, 205, and 210, The RF carrier signal containing the modulated information is coupled to a transmit antenna 220, which broadcasts the information to the satellite 55.

Figure 3:
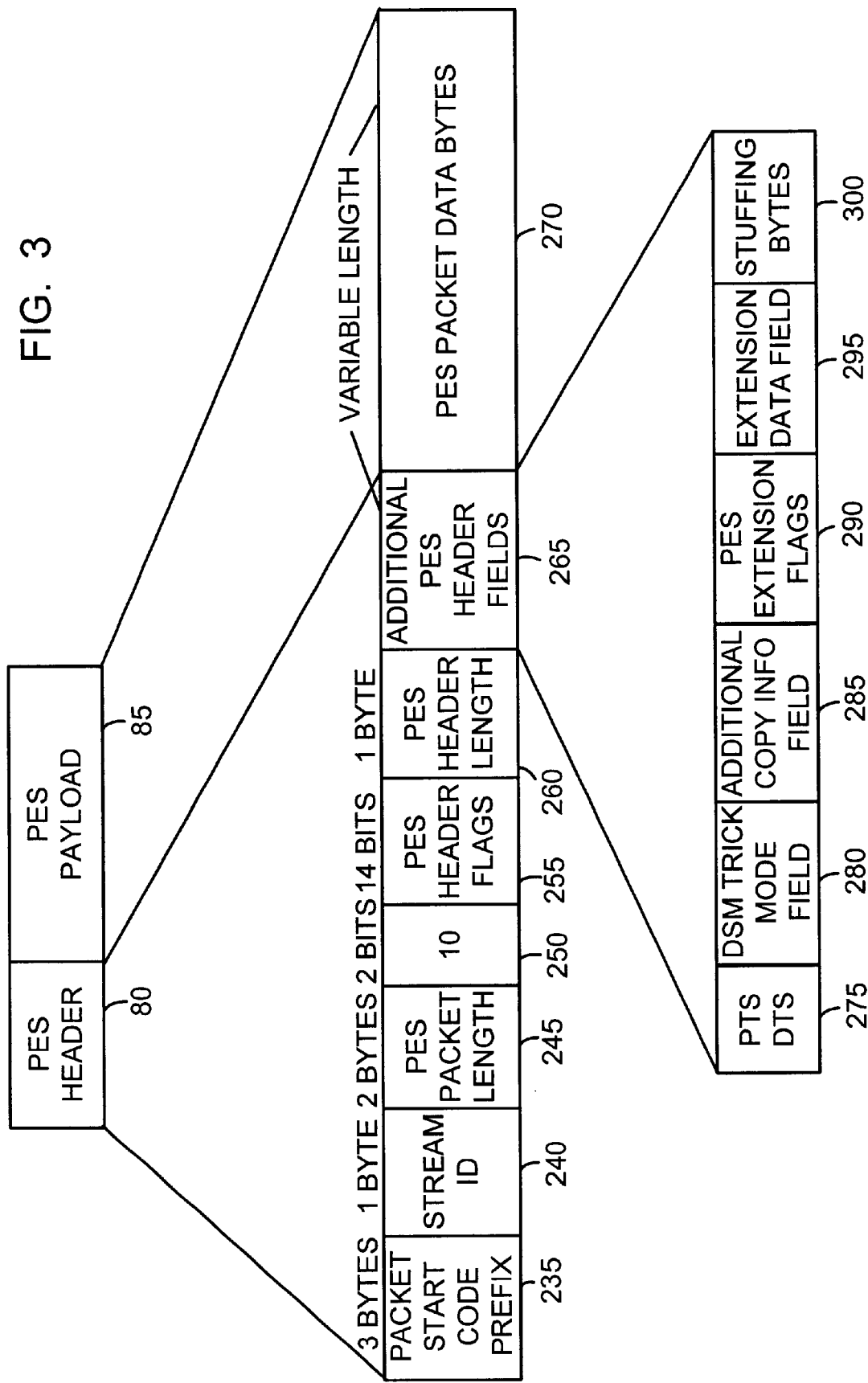
FIG. 3 is a diagram of a conventional PES packet showing details of the PES header fields.

FIG. 3 is a detailed diagram of a conventional PES packet shown in FIG. 2. The following description of the conventional PES packet focuses on information that is key to the understanding of the present invention. More thorough information regarding PES packets may be found in the "ATSC Digital Television Standard" and "Guide to the Use of the ATSC Digital Television Standard," which are published by the Advanced Television Systems Committee and are referred to as documents A/53 and A/54, respectively, and are hereby incorporated by reference.

The conventional PES packet shown in FIG. 3 includes a PES header (e.g., 80) and a PES payload (e.g., 85), which may have a variable length. As is known in the art, the PES header 80 includes a number of fields including a packet start code prefix 235, which is a predetermined code that is used to identify the start of a new PES packet. A one byte stream ID 240 is a number that is unique to each PES stream (e.g., video, audio or data) and is used to identify each PES stream during filtering at the receiver station 60. A two byte PES packet length field 245 is used to represent the length field of the PES packet on which the header is placed. A two bit field 250 containing 1 0 is located after PES packet length 245. A fourteen bit PES header flag field 255 is used to indicate various flags that are placed in the PES header 80. A one byte PES header data length field 260 is used to indicate the length of optional fields and stuffing bytes. Additional PES header fields 265 include a number headers that are used in processing the PES packet at the receiver station 60.

As is known, a PTS/DTS field 275 contained in the additional PES header fields 265 contains information representative of a presentation time stamp (PTS) and a decoding time stamp (DTS) The PTS is used to inform the receiver station 60 of the intended time of presentation of the presentation unit following the PES header 80. The PTS refers to the presentation time of the first access unit occurring in the PES payloads. The DTS specifies the time at which an access unit should be decoded. If a PES packet does not contain an access unit, the PTS/DTS field 275 of the header will not contain a PTS/DTS.

Conventionally, in a satellite broadcast system a reference time clock (RTC) for a transport encoder is a 32 bit binary counter that is clocked at 27 MHz. This counter "wraps" or "loops" approximately every 2.5 minutes. The wrapping time was selected as sufficiently long enough to prevent transmitted elements from being confused with one another. However, as is known, the MPEG-2 transport utilized by the HDTV system uses a 33-bit counter, clocked at 90 KHz. This rate is ⅓₀₀th the rate of the satellite broadcast RTC. The MPEG-2 transport clock wraps every 26.5 hours.

In accordance with one preferred embodiment of the present invention, one satellite may carry both SDTV and HDTV information. Typically, auxiliary data packets, which contain the value of the RTC, reference time stamps (RTS) or encryption control word packets, are sent to receiver stations. The RTS represents the time at which the last bit of the packet left the encoder. The RTS is used by the receiver station 60 to synchronize its 27 MHz clock with the transmission station 50 clock. In traditional satellite broadcast systems the RTS is carried on the same SCID as the program with which it is associated, but the RTS is contained in auxiliary data packets.

Conventionally, transport demultiplexers in the receiver stations 60 use the RTC in the auxiliary data packets to synchronize the local 27 MHz clock reference with the clock at the transmission station. Audio and video are then displayed according to the RTC, which is synchronized with the receiver's local clock. Since the MPEG-2 clock and the RTC, which is used to synchronize the receiver station 60 27 MHz clock, operate at different speeds, a comparison between the PTS/DTS field 275 and the receiver station 60 clock will not appropriately indicate when a video or audio packet should be decoded and presented. Accordingly, the contents of the PTS/DTS field 275 must be converted before a comparison is made to the receiver station 60 clock. In accordance with one embodiment of the present invention, the PTS/DTS field 275 is defined as the RTC value divided by 300. The maximum value of the PTS is $(2^{32}-1)/300$, which is the wrap value of an unsigned 32 bit counter. Since both audio and video PES packets wrap at the same rate, the audio and the video will be synchronized and will be appropriately displayed. Accordingly, in keeping with the present invention, to resolve timing between PTS/DTS field 275 and receiver station 60 clock, the receiver stations 60 multiply the contents of PTS/DTS field 275 by 300 before comparing it to the receiver station 60 clock. This scheme provides a communications transport capable of transferring HDTV data along with conventional SDTV data to a number of receiver stations 60 using existing hardware and minor software modifications to the receiver stations 60. Specifically, in keeping with the present invention, the receiver stations 60 must be programmed to recognize HDTV PES headers and to multiply the content of the PTS/DTS field 275 of a HDTV PES header by 300 before comparing its value to the clock located in the receiver station 60.

Figure 4:
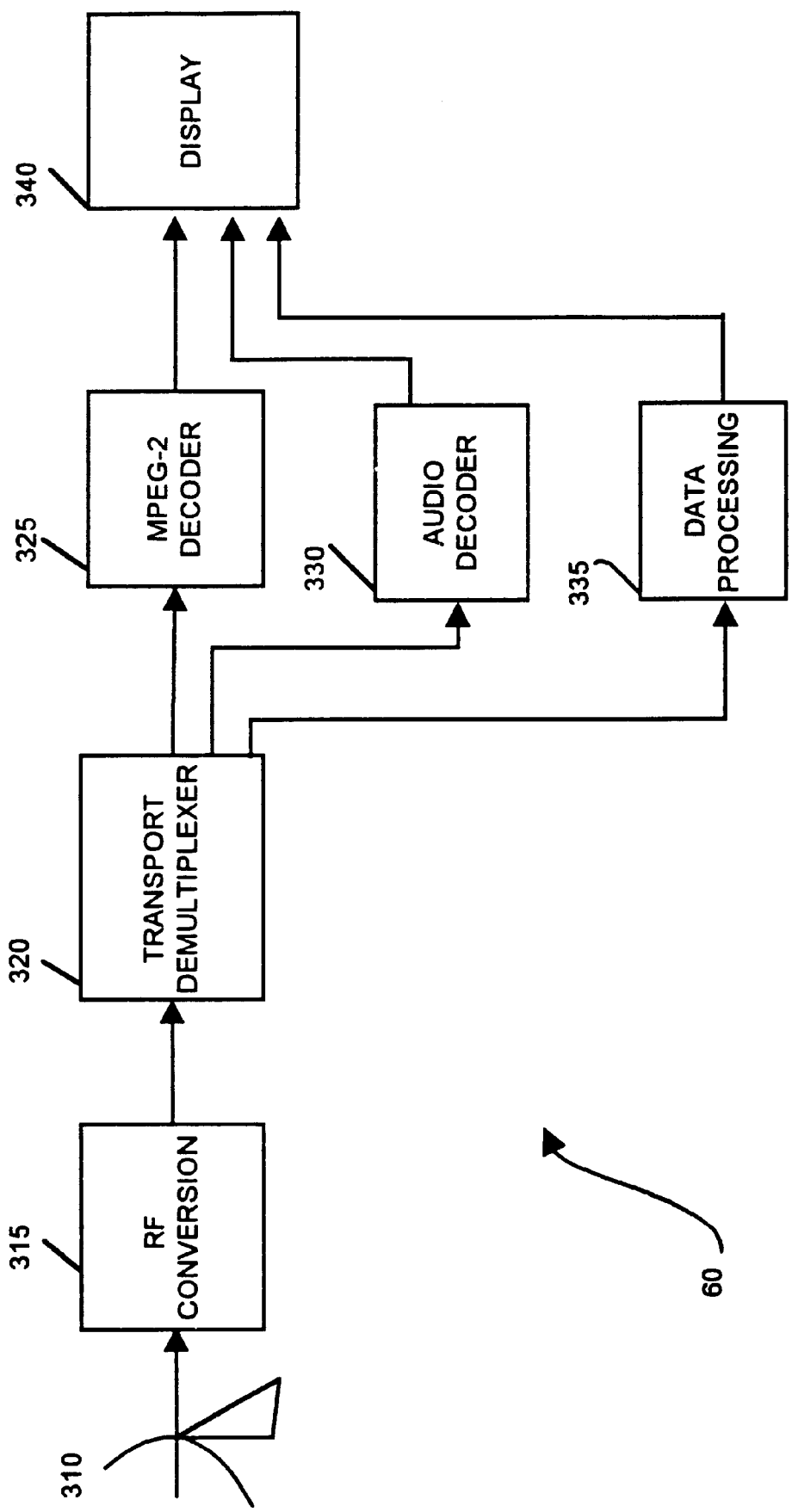
FIG. 4 is a detailed diagram of the receiver station shown in FIG. 1.
Figure 5:
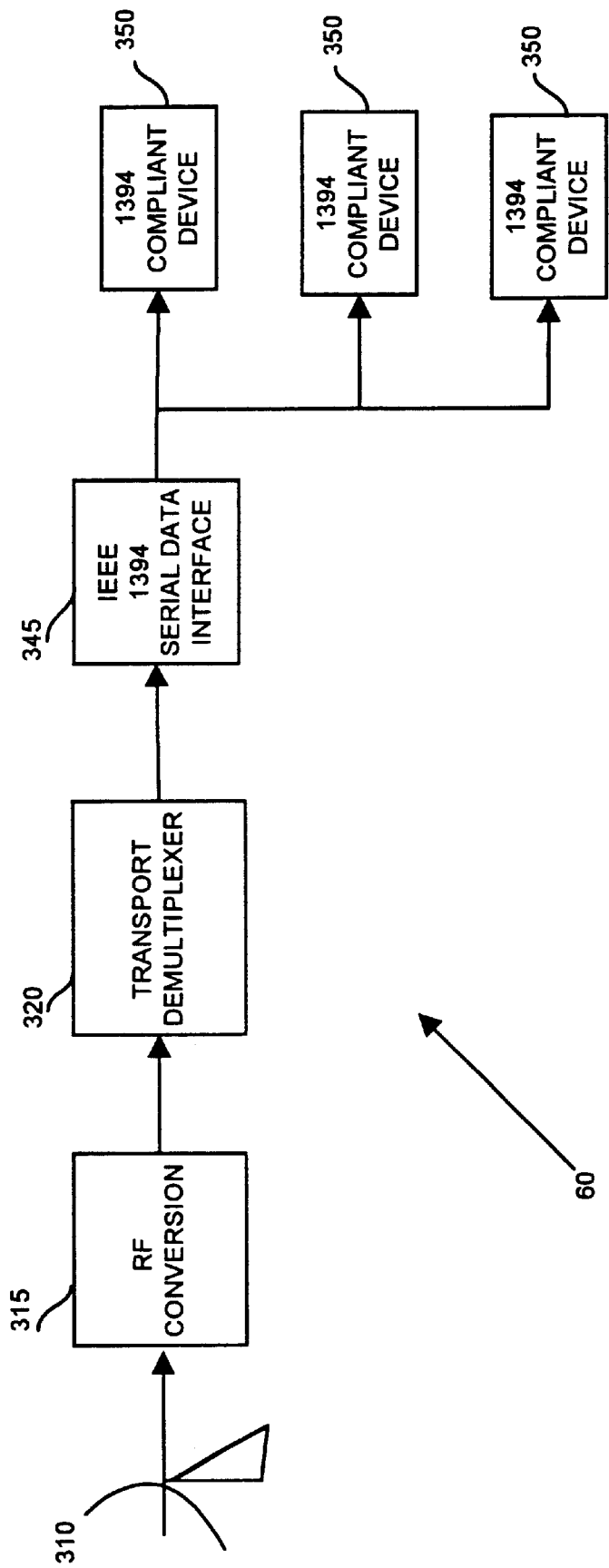
FIG. 5 is a detailed diagram of an alternate embodiment of the receiver station shown in FIG. 1.

FIGS. 4 and 5 are detailed block diagrams of the receiver station 60 shown in FIG. 1. In one embodiment the receiver station 60 includes an antenna 310, an RF conversion function 315, and a transport demultiplexer 320. The receiver station 60 further includes an MPEG-2 decoder 325, an audio decoder 330, a data processing function 335, and a display 340. Signals from the satellite 55 are received by the antenna 310 and are passed to the RF conversion function 315, which appropriately processes the signals. Processing may include downconversion, filtering, amplification or other processing.

After the received signals are appropriately processed, they are passed to the transport demultiplexer 320, which demultiplexes the data packets in the received signals into video, audio and data streams. The video, audio, and data streams are coupled to the MPEG-2 decoder 325, the audio decoder 330, and the data processing function 335, respectively. The MPEG-2 decoder 325 appropriately processes the video signal and passes the signal to the display 340. Similarly, the audio decoder 330 processes the audio PES stream to produce signals that are passed to the display 340. In accordance with one embodiment of the present invention, processing of the audio and video PES streams includes determining if the PES streams are HDTV PES streams. If the PES streams are HDTV stream, the contents of the PTS/DTS field 275 are multiplied by 300 before it is compared to the receiver station 60 clock. Accordingly, this processing allows SDTV signals to be handled by the receiver in a conventional manner and allows special processing on HDTV signals. The need to resolve the differences between the PTS/DTS filed 275 and the receiver station 60 clock is unique to this particular embodiment of the present invention. Because the DTH satellite hardware is in place, there is a need to resolve timing reference differences. Accordingly, not all, or even any other, embodiments of the present invention will need to resolve timing reference differences.

The data processing function 335 processes any data that was sent as a data stream. The data processing function 335 may perform the function of creating a digital program guide, providing conditional access or other data related tasks within the receiver station 60.

In an alternate embodiment shown in FIG. 5, data from the transport demultiplexer 320 is passed to an IEEE 1394 serial data interface 345, which converts the signals to standard serial digital interface signals. The IEEE interface 345, in turn, passes the serial data to a number of IEEE 1394 compliant devices 350. These devices may include video displays, video tape recorders, and read/write digital video disk units.

Figure 6:
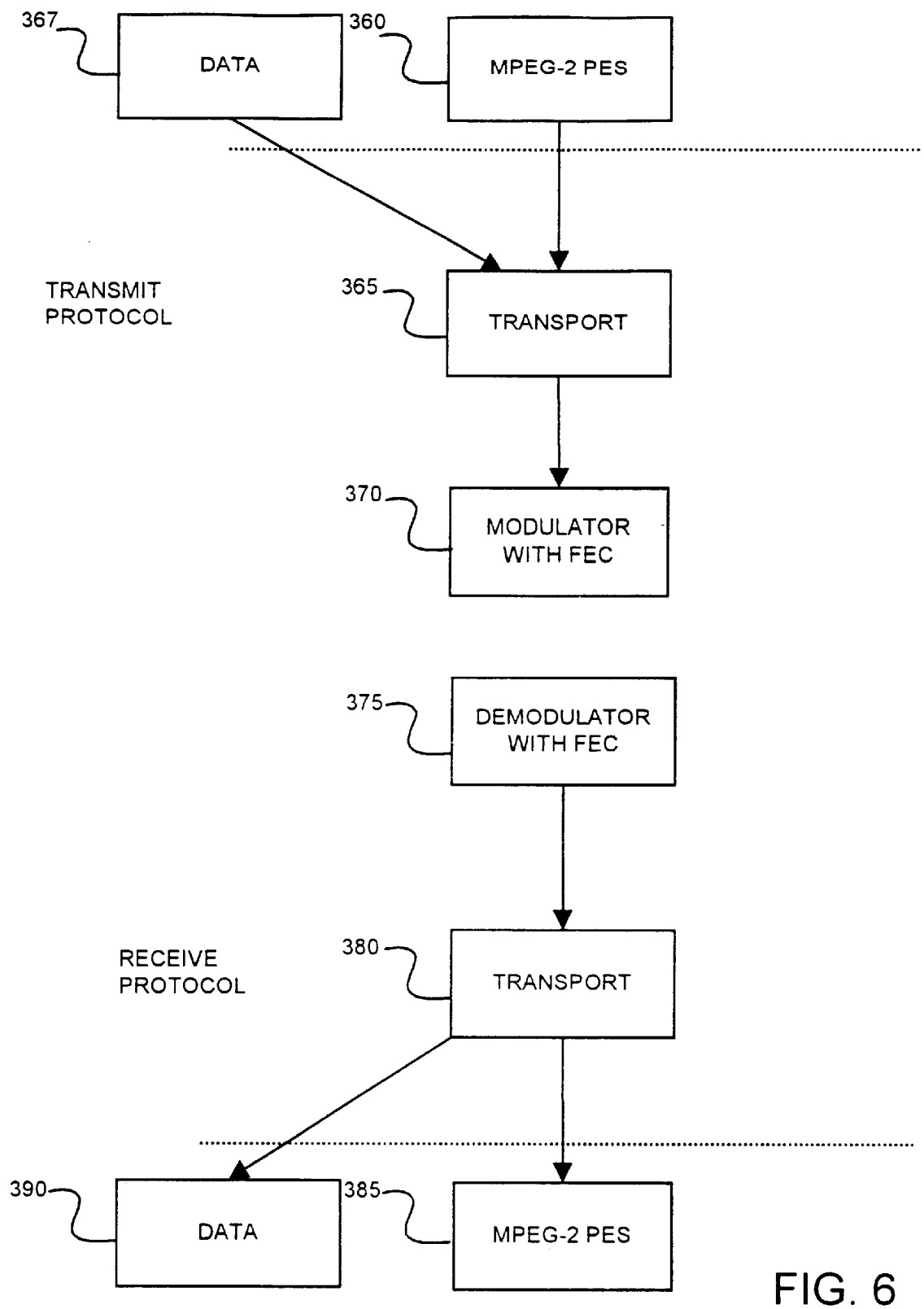
FIG. 6 is a diagram of the transmit and receive protocol stacks used in accordance with the present invention.

FIG. 6 represents a protocol stack representation of the data transfer from the transmission station 50 to the receiver station 60. Conventional MPEG-2 PES streams 360, such as the streams generated by the PES packetizers 70, 105 (shown in FIG. 2) are transferred to a transport layer 365 along with any other data 367 that is to be broadcast. In accordance with the present invention, the transport layer 365 processes the MPEG-2 PES streams and the data for transmission into, for example, 127 byte payloads with 3 byte headers. The processing may be carried out by a multiplexer (e.g., a statistical multiplexer), such as the transport multiplexer and repacketizer 155. The functionality above the dotted line in the transmit protocol is conventional and known. However, the processing performed on the MPEG-2 PES streams 360 by the transport 365, is novel. The payloads and headers are passed from the transport layer 365 to a modulator 370 having forward error correction (FEC) capabilities 370, which modulates a carrier signal to encode the information from the payloads and the headers. Many modulation schemes such as QPSK, DQPSK, FSK or QQPSK may be used in accordance with the present invention.

The receive protocol receives the modulated carrier signal at a demodulator 375 having forward error correction (FEC) capabilities. The demodulator 375 demodulates the carrier signal to obtain the information contained in the packets and the headers. The demodulated information is passed to a transport layer 380, which, in accordance with the present invention, strips off the transport header added by the transport layer 365, and re-assembles the MPEG-2 PES streams and the data stream. Re-assembly may be accomplished through examination of PES headers and concatenating individual PES packets together to create a PES stream. In keeping with the present invention, the assembled MPEG-2 PES streams are passed to an MPEG-2 PES layer 385, which appropriately processes the MPEG-2 PES stream in to an audio PES stream and a video PES stream. In accordance with the present function, processing includes determining if the PES streams are HDTV PES streams, and if the PES streams are HDTV streams, the PTS/DTS field 275 from the PES headers are multiplied by 300 before they are compared to the receiver station 60 clock. This comparison allows the receiver station to appropriately determine the time for presentation of the data in the PES stream. The transport 380 also passes data that is not part of a PES stream to a data function 390. Accordingly, except for the novel feature of multiplying the contents of the PTS/DTS field 275 by 300, the PES packets are processed in a conventional manner by the MPEG-2 PES layer 385. In fact, although it is required by one embodiment of the present invention, multiplying the contents of the PTS/DTS field 275 by 300 may not be required in other embodiments.

The present invention provides a method for transmitting standard MPEG-2 PES streams that are used for HDTV in any transport protocol. The present invention works independent of any protocol that is used to transport the PES streams. Similarly, on the receive side, the broadcast MPEG-2 PES streams are re-assembled into their original format after they are received. Thus allowing the PES streams to be processed in a conventional manner once they are received. Accordingly, the present invention allows for the use of all standard equipment that processes MPEG-2 PES streams.

Of course, it should be understood that a range of changes and modifications can be made to the preferred embodiment described above. For example, transport packets need not be 130 bytes but may be 188 bytes as used in digital video broadcast (DVB) applications or 53 bytes as used in ATM systems. As will be apparent to those skilled in the art, any other reasonable transport packet size is usable. It is therefore intended that the foregoing detailed description be regarded as illustrative rather than limiting and that it be understood that it is the following claims, including all equivalents, which are limited to define the scope of this invention.

What is claimed:

1. A receiver station for receiving transmissions, comprising:
   a transport demultiplexer for demultiplexing a received signal into a video component having an associated time stamp; a local clock reference; and
   a video decoder coupled to the transport demultiplexer and the local clock reference for decoding the video component, wherein the video decoder compares the time stamp to the local clock reference after the time stamp is multiplied by a multiplication factor.

2. The receiver station of claim 1, wherein the received signal comprises data having a high definition television (HDTV) format.

3. The receiver station of claim 1, wherein the received signal comprises data having a standard definition television (SDTV) format.

4. The receiver station of claim 1, wherein the video component includes a header and a payload and wherein the time stamp associated with the video component is contained in the header of the video component.

5. The receiver station of claim 1, wherein the multiplication factor is 300.

6. The receiver station of claim 1, wherein the video decoder comprises an MPEG-2 video decoder.

7. The receiver station of claim 1, wherein the transport demultiplexer further demultiplexes the received signal into an audio component having an associated time stamp.

8. The receiver station of claim 7, further comprising an audio decoder coupled to the transport demultiplexer and the local clock reference for decoding the audio component, wherein the audio decoder compares the time stamp to the local clock reference after the time stamp is multiplied by a multiplication factor.

9. The receiver station of claim 8, wherein the audio decoder comprises an AC-3 Dolby Digital decoder.

10. The receiver station of claim 8, wherein the audio component includes a header and a payload and wherein the time stamp associated with the audio component is contained in the header of the audio component.

11. The receiver station of claim 1, wherein the time stamp is a presentation time stamp.

12. For use in a receiver having a local reference clock, a method of receiving signals comprising the steps of:
   demultiplexing a received signal into a video component having an associated time stamp;
   reading a time from the local clock reference;
   decoding the video component by comparing the time stamp to the time from the local clock reference after the time stamp is multiplied by a multiplication factor; and
   presenting the decoded video component to an output device.

13. The method of claim 12, wherein the video component includes a header and a payload and wherein the time stamp associated with the video component is contained in the header of the video component.

14. The method of claim 12, wherein the multiplication factor is 300.

15. The method of claim 12, wherein the step of decoding the video component is performed by an MPEG-2 video decoder.

16. The method of claim 12, wherein the step of decoding the audio component is performed by an AC-3 Dolby Digital decoder.

17. The method of claim 12, wherein the received signal comprises data having a high definition television (HDTV) format.

18. The method of claim 12, wherein the received signal comprises data having a standard definition television (SDTV) format.

19. The method of claim 12, further comprising the steps of:
   demultiplexing the received signal into an audio component having an associated time stamp;
   decoding the audio component by comparing the time stamp to the time from the local clock reference after the time stamp is multiplied by a multiplication factor; and
   presenting the decoded audio component to an output device.

20. The method of claim 12, wherein the time stamp is a presentation time stamp.

* * * * *